A. J. BRIDGES.
GRAIN TESTER.
APPLICATION FILED JAN. 8, 1917.
1,230,855.
Patented June 26, 1917.
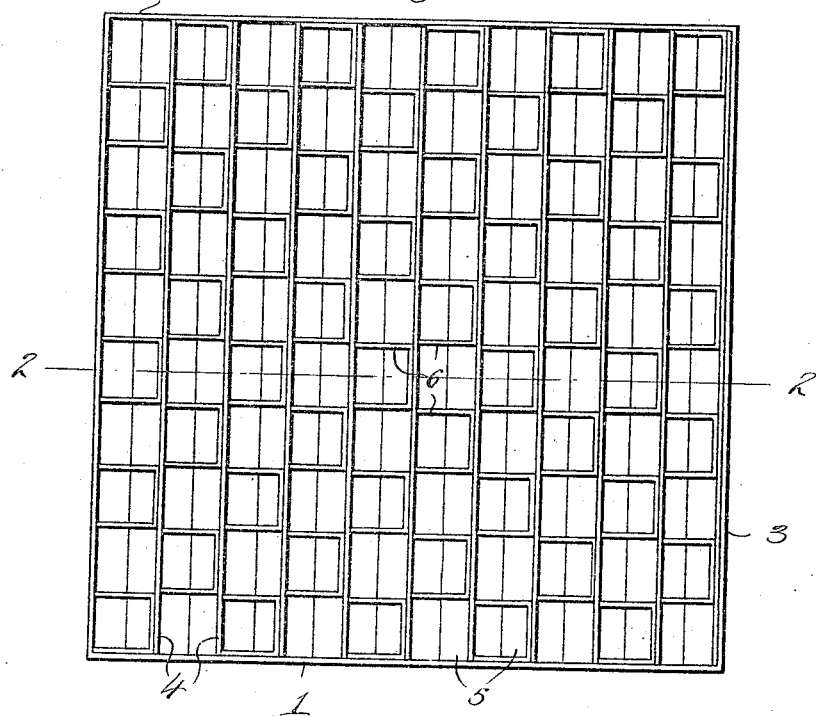
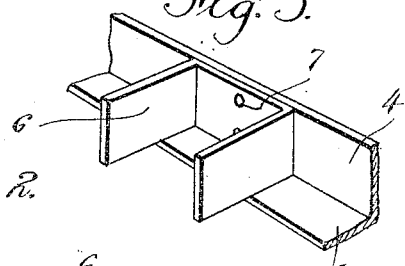
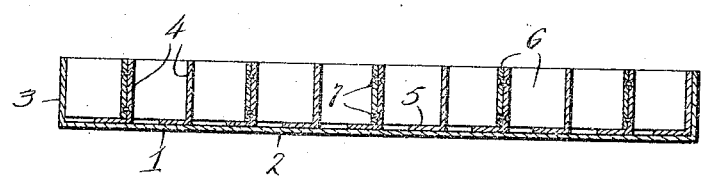
Inventor
Alonzo J. Bridges.
By Richard B. Owen,
Attorney
Witness
Chas. E. Kemper.
Lloyd W. Patch.

UNITED STATES PATENT OFFICE.

ALONZO J. BRIDGES, OF BEDFORD, IOWA.

GRAIN-TESTER.

1,230,855.

Specification of Letters Patent.

Patented June 26, 1917.

Application filed January 8, 1917. Serial No. 141,295.

*To all whom it may concern:*

Be it known that I, ALONZO J. BRIDGES, a citizen of the United States, residing at Bedford, in the county of Taylor and State of Iowa, have invented certain new and useful Improvements in Grain-Testers, of which the following is a specification.

This invention relates to improvements in grain testers, and more particularly to trays adapted to have seed corn or other grain placed therein and sprouted to show the quality and the vitality of samples of grain taken from ears or heads of grain and intended for seed.

An object of my invention is to provide a tray structure in which the compartments for the reception of the various grain samples are formed by fitting a plurality of partitions within an outer container, and in so arranging the partition members that bottom extensions are provided thereon and then as the partitions are removed from the outer container, the sprouted grain will be also lifted out and will be exposed to view, thus obviating the necessity of picking the grain from each separate compartment, as in the use of the ordinary testing trays now in use.

A further object resides in so constructing and arranging the partitions that a number of substantially U-shaped division partition portions are carried thereby and thus as one of the main partitions is removed the grain in several of the testing compartments will be taken from the tray and the time and labor required in the examination of the contents of a tray will be materially lessened, while at the same time the grain in several compartments will be exposed so that comparison of the vitality of the several samples can be made.

With the above and other objects in view my invention consists in certain novel features of construction and combination of parts to be hereinafter set forth in connection with the drawings and then more particularly pointed out in the claims.

In the drawings:—

Figure 1 is a view in plan showing a tray constructed after the manner of my invention.

Fig. 2 is a transverse sectional view taken on the line 2—2 of Fig. 1.

Fig. 3 is a fragmentary perspective view showing a part of one of the main partitions with the division partition number fitted thereon.

The outer container or tray 1 is preferably square or rectangular, although this container or tray might be of other configuration, and the bottom portion 2 has the side walls 3 extending upwardly therefrom.

A plurality of main partitions 4 are made of such length that they will set substantially across one of the dimensions of the tray and between the side walls thereof, and these main partitions each have the inturned flange 5, which gives additional strength to the partition portion 4 and will form a partial bottom for the various compartments of the tray in a manner to be more fully described hereinafter.

A plurality of substantially U-shaped division partition members 6 are secured by rivets 7, by welding, or in any other desired manner, upon the main partition members 4 to have their lower edges rest upon the inwardly extending flanges 5, these division partition members 6 being preferably spaced apart as shown in Fig. 1 so that along the length of each of the main partition members 4, the parallel extending arms of the members 6 extend to be disposed at substantially equally spaced distances apart. In placing the partition members 4 having the division partition members 6 mounted thereon, within the tray, the various main partition members will be set so that the division partition members 6 as carried by the next adjacent main partition members will abut at the free ends against the outer face thereof, and thus as all of the main partition members for the particular tray are fitted in place, the entire tray will be divided off into a plurality of divisions of substantially equal size.

In the use of the tray, the samples of grain to be tested, say a half-dozen kernels of corn from each ear, are placed in the separate divisions of the tray as formed by the fitting of the partitions 4 and the cross divisions made by the partitions 6, and thus in the structure as shown where ten main partitions each having the length thereof divided by the division partition 6 to make 10 divisions along the length of the main partition are employed, 100 of the small divisions will be formed and test of 100 samples can be made at one time. Following the placing of the kernels or grains within the divisions, the tray can be filled with warm water and permitted to stand until the grain is saturated in all of the compartments after which the water may be drained off and the tray set away for the seed to germinate. It will be appreciated that any method of procedure might be followed in sprouting of the grain, and when the samples have been properly sprouted, the character of the growth of the samples within any one of the divisions can be determined by picking the scattered kernels out in the usual manner, but with the use of the structure as defined, the raising of one of the main partitions 4 will bring all of the kernels as contained in the divisions separated off by the division partitions 6 secured in conjunction with the main partition 4 due to the fact that the flange 5 extends beneath the various compartments. The sprouted grain will be held upon this flange 5 and thus the character of the growth within the various divisions can be viewed and comparison can be made of the plurality of samples. It will be understood that the various main partitions can be removed consecutively one after the other or the partitions can be selectively taken from the tray and in either case the sprouted grain will be taken from the tray by the arrangement of the parts of the partition and the samples will be presented in the continuous line for ready observation and comparison. The extension of the flange 5 is made to carry this bottom wall of the compartment only partly across the width thereof, and thus as water may be filled into the tray to give the desired moisture to the seed, the water will flow freely to all parts of the tray and the grain in each of the compartments or divisions will receive the same amount of moisture due to the fact that the water will rise equally in all parts of the entire structure.

From the foregoing it will be seen that I have provided a grain testing tray which presents a number of separate divisions or compartments in which corn or other grain or seed can be placed in separate quantities and will be maintained in the separate relation, and that the formation of the main partition with the bottom flange and with this disposition of the division partitions thereon provides such a structure that as the main partitions are lifted from the tray, the seed as contained in the several compartments or divisions formed adjacent thereto will be also taken from the tray and will be presented in such relation that the various samples can be readily examined and can be compared to determine the relative quality and character of the growth.

While I have herein shown and described only one specific form of the structure, it will be understood that a number of changes and variations might be resorted to in the form and arrangement of the several parts without departing from the spirit and scope of my invention, in view of which I do not wish to be limited to the exact disclosure but only to such points as may be set forth in the claims.

I claim:—

1. A seed tester including a tray, a plurality of separate main partitions to be fitted in the tray, and substantially U-shaped division partitions carried by each of the main partitions to sub-divide the spaces between the main partitions and thus form a plurality of separate compartments.

2. A seed tester including a tray, a plurality of partitions removably fitted within the tray to block the same off into a plurality of separate compartments, and flanges carried by certain of said partitions to form partial false bottoms for the compartments.

3. A grain tester including a tray, a plurality of main partitions each having a laterally disposed flange extending at its lower edge, said main partitions made of such length that they may be fitted within the tray in parallel relation to divide off the tray, and division partitions carried by each of the main partitions to extend to and butt against the next adjacent partition to thus separate the spaces divided off by the main partitions into a plurality of compartments, the construction of the parts being such that as any one of the main partitions is lifted from the tray the division partitions will present the compartments with one of the sides thereof left open.

4. A seed tester including a tray, a plurality of main partitions arranged to be placed in parallel mounting across the tray, substantially U-shaped division partitions carried by the main partitions to subdivide the spaces thereof there-between to form a number of separate compartments, and laterally extending flanges provided on the lower edges of the main partitions to extend for a fractional part of the length of the division partitions.

In testimony whereof I affix my signature in presence of two witnesses.

ALONZO J. BRIDGES.

Witnesses:
K. E. STEPHENS,
C. E. POSE.

Copies of this patent may be obtained for five cents each, by addressing the "Commissioner of Patents, Washington, D. C."